(12) United States Patent
Siddiqui

(10) Patent No.: US 10,346,712 B2
(45) Date of Patent: *Jul. 9, 2019

(54) METRIC-BASED RECOGNITION, SYSTEMS AND METHODS

(71) Applicant: Nant Holdings IP, LLC, Culver City, CA (US)

(72) Inventor: Matheen Siddiqui, Culver City, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,458

(22) Filed: Oct. 5, 2018

(65) Prior Publication Data

US 2019/0042873 A1    Feb. 7, 2019

Related U.S. Application Data

(63) Continuation of application No. 15/785,932, filed on Oct. 17, 2017, now Pat. No. 10,121,092, which is a
(Continued)

(51) Int. Cl.
*G06K 9/46* (2006.01)
*H04N 1/40* (2006.01)
(Continued)

(52) U.S. Cl.
CPC ....... *G06K 9/4652* (2013.01); *G06F 16/3331* (2019.01); *G06F 16/51* (2019.01);
(Continued)

(58) Field of Classification Search
CPC .......... G06F 17/3025; G06F 17/30256; G06F 17/30247; G06F 17/30324;
(Continued)

(56) References Cited

U.S. PATENT DOCUMENTS 5,731,818 A    3/1998 Wan et al.
5,861,871 A *  1/1999 Venable ................. H04N 1/622
                                            345/589
(Continued)

FOREIGN PATENT DOCUMENTS

EP    1437686 A2   12/2003
GB    2471036 B     8/2012
(Continued)

OTHER PUBLICATIONS

International Search Report and Written Opinion issued in International Application No. PCT/US2014/051764 dated Dec. 1, 2014, 9 pages.
(Continued)

*Primary Examiner* — Manav Seth
(74) *Attorney, Agent, or Firm* — Mauriel Kapouytian Woods LLP; Lawrence Gabuzda; Andrew Noble

(57) ABSTRACT

Apparatus, methods and systems of object recognition are disclosed. Embodiments of the inventive subject matter generates map-altered image data according to an object-specific metric map, derives a metric-based descriptor set by executing an image analysis algorithm on the map-altered image data, and retrieves digital content associated with a target object as a function of the metric-based descriptor set.

31 Claims, 4 Drawing Sheets

Related U.S. Application Data continuation of application No. 15/487,031, filed on Apr. 13, 2017, now Pat. No. 9,824,292, which is a continuation of application No. 14/463,617, filed on Aug. 19, 2014, now Pat. No. 9,659,033.

(60) Provisional application No. 61/867,525, filed on Aug. 19, 2013.

(51) Int. Cl.

| | | |
|---|---|---|
| *G06F 16/51* | (2019.01) | |
| *G06F 16/783* | (2019.01) | |
| *G06F 16/907* | (2019.01) | |
| *G06F 16/33* | (2019.01) | |
| *G06F 16/583* | (2019.01) | |
| *G06F 16/732* | (2019.01) | |
| *G06K 9/00* | (2006.01) | |

(52) U.S. Cl.
CPC ...... *G06F 16/5838* (2019.01); *G06F 16/7335* (2019.01); *G06F 16/785* (2019.01); *G06F 16/907* (2019.01); *G06K 9/00476* (2013.01); *G06K 9/4604* (2013.01); *G06K 9/4671* (2013.01); *H04N 1/40012* (2013.01)

(58) Field of Classification Search
CPC ......... G06F 17/30657; G06F 17/30784; G06F 17/30802; G06F 17/30831; G06F 17/30997; G06F 17/3028; G06F 16/3331; G06F 16/785; G06F 16/51; G06F 16/7335; G06F 16/907; G06F 16/5838; G06K 9/00476; G06K 9/4652; G06K 9/4671; G06K 9/4604; H04N 1/40012
See application file for complete search history.

(56) References Cited

U.S. PATENT DOCUMENTS

| | | | | |
|---|---|---|---|---|
| 6,016,487 | A * | 1/2000 | Rioux | G06F 17/3025 707/743 |
| 6,173,066 | B1 * | 1/2001 | Peurach | G06F 17/3079 348/169 |
| 6,259,815 | B1 * | 7/2001 | Anderson | G06K 9/6206 382/218 |
| 6,441,869 | B1 | 8/2002 | Edmunds | |
| 6,628,829 | B1 * | 9/2003 | Chasen | G01J 3/46 382/165 |
| 7,016,532 | B2 | 3/2006 | Boncyk et al. | |
| 7,046,840 | B2 * | 5/2006 | Chang | G06T 17/10 345/420 |
| 7,127,127 | B2 * | 10/2006 | Jojic | G06F 17/30259 382/305 |
| 7,130,466 | B2 * | 10/2006 | Seeber | G06F 17/30256 382/218 |
| 7,415,153 | B2 * | 8/2008 | Mojsilovic | G06T 7/90 345/589 |
| 7,418,113 | B2 * | 8/2008 | Porikli | G06K 9/32 348/143 |
| 7,499,590 | B2 * | 3/2009 | Seeber | G06F 17/30256 382/103 |
| 7,555,148 | B1 * | 6/2009 | Steinberg | G06F 17/30247 340/5.53 |
| 7,561,723 | B2 * | 7/2009 | Goldberg | G03D 15/001 382/115 |
| 7,564,994 | B1 * | 7/2009 | Steinberg | G06F 17/30247 340/5.53 |
| 7,590,310 | B2 * | 9/2009 | Retterath | G06K 9/3233 382/190 |
| 7,657,100 | B2 * | 2/2010 | Gokturk | G06F 17/30256 382/209 |
| 7,657,126 | B2 * | 2/2010 | Gokturk | G06F 17/30259 358/403 |
| 7,672,508 | B2 * | 3/2010 | Li | G06F 17/3025 382/162 |
| 7,680,341 | B2 * | 3/2010 | Perronnin | G06K 9/00281 382/159 |
| 7,711,146 | B2 * | 5/2010 | Tu | G06K 9/00295 348/143 |
| 7,755,817 | B2 | 7/2010 | Ho et al. | |
| 7,783,135 | B2 * | 8/2010 | Gokturk | G06F 17/30253 382/209 |
| 7,813,561 | B2 * | 10/2010 | Jia | G06K 9/4671 382/155 |
| 7,898,576 | B2 * | 3/2011 | Miller | G06F 17/3079 348/222.1 |
| 8,040,361 | B2 | 10/2011 | Bachelder et al. | |
| 8,139,853 | B2 * | 3/2012 | Mojsilovic | G06T 7/90 382/165 |
| 8,218,873 | B2 | 7/2012 | Boncyk et al. | |
| 8,224,029 | B2 * | 7/2012 | Saptharishi | G06K 9/00771 382/103 |
| 8,224,077 | B2 * | 7/2012 | Boncyk | G06F 17/30256 382/165 |
| 8,224,078 | B2 * | 7/2012 | Boncyk | G06F 17/30259 382/165 |
| 8,289,391 | B2 | 10/2012 | Kiyohara et al. | |
| 8,306,315 | B2 * | 11/2012 | Inoue | G06F 17/30247 382/154 |
| 8,345,982 | B2 * | 1/2013 | Gokturk | G06F 17/30259 382/190 |
| 8,446,492 | B2 | 5/2013 | Nakano et al. | |
| 9,262,696 | B2 * | 2/2016 | Ratcliff | H04N 5/23222 |
| 9,355,123 | B2 * | 5/2016 | Wnuk | G06F 17/30247 |
| 9,501,498 | B2 * | 11/2016 | Wnuk | G06F 17/30268 |
| 9,508,009 | B2 * | 11/2016 | Wnuk | G06F 17/30247 |
| 9,659,033 | B2 * | 5/2017 | Siddiqui | G06K 9/4652 |
| 9,824,292 | B2 | 11/2017 | Siddiqui | |
| 10,121,092 | B2 * | 11/2018 | Siddiqui | G06K 9/4652 |
| 2002/0090132 | A1 * | 7/2002 | Boncyk | G06F 17/30256 382/154 |
| 2005/0134479 | A1 | 6/2005 | Isaji et al. | |
| 2011/0064301 | A1 * | 3/2011 | Sun | G06K 9/468 382/159 |
| 2011/0316963 | A1 | 12/2011 | Li et al. | |
| 2012/0147163 | A1 | 6/2012 | Kaminsky | |
| 2012/0274777 | A1 | 11/2012 | Saptharishi et al. | |
| 2013/0108177 | A1 | 5/2013 | Sukthankar et al. | |
| 2013/0113877 | A1 | 5/2013 | Sukthankar et al. | |
| 2013/0114902 | A1 | 5/2013 | Sukthankar et al. | |
| 2013/0117780 | A1 | 5/2013 | Sukthankar et al. | |
| 2018/0039851 | A1 | 2/2018 | Siddiqui | |

FOREIGN PATENT DOCUMENTS

| | | |
|---|---|---|
| GB | 2491987 A | 12/2012 |
| JP | 08-096130 A | 4/1996 |
| JP | 2004-005715 A | 1/2004 |
| JP | 2012-150552 A | 8/2012 |
| WO | 2013-056315 A1 | 4/2013 |
| WO | 2013-066688 A1 | 5/2013 |
| WO | 2013-066723 A1 | 5/2013 |

OTHER PUBLICATIONS

Lopes, Ana P.B, et al., "A Bag-of-Features Approach Based on Hue-Sift Descriptor for Nude Detection," 17th European Signal Processing Conference, Aug. 24-28, 2009, 5 pages.

"RGB to HSV Color Conversion," downloaded from http://www.rapidtables.com/convert/color/rgb-to-hsv.htm on Aug. 14, 2014, 1 page.

Van De Sande, Koen E.A., et al., "Evaluation of Color Descriptors for Object and Scene Recognition," Pattern Analysis and Machine Intelligence, IEEE Transactions, Aug. 18, 2009, vol. 32—Issue 9, 8 pages.

* cited by examiner

METRIC-BASED RECOGNITION, SYSTEMS AND METHODS

This application is a continuation of U.S. application Ser. No. 15/785,932 filed Oct. 17, 2017, which is a continuation of U.S. application Ser. No. 15/487,031 filed on Apr. 13, 2017, which is a continuation of U.S. application Ser. No. 14/463,617 filed on Aug. 19, 2014, which claims priority to 61/867,525 filed Aug. 19, 2013. These and all other extrinsic references referenced herein are incorporated by reference in their entirety.

FIELD OF THE INVENTION

The field of the invention is object recognition technologies.

BACKGROUND

The following description includes information that may be useful in understanding the present invention. It is not an admission that any of the information provided herein is prior art or relevant to the presently claimed invention, or that any publication specifically or implicitly referenced is prior art.

Some previous efforts have been placed on object recognition technologies, especially technologies involving the use of a camera-equipped mobile device. Some exemplary techniques can be found in co-owned U.S. Pat. Nos. 7,016,532; 8,224,077; 8,224,078; and 8,218,873.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Unfortunately known techniques utilized for object recognition generally rely on analysis of grayscale images. While these technologies can be utilized to recognize a wide range of objects, it has shown to create problems in attempts to recognize objects that have little color variation (hereinafter referred as "monochrome objects"), especially where representations of such objects are captured under different lighting environments. For example, toys from various brands might have numerous human recognizable parts that cast or molded in same color plastics. When an image of the toy is converted to grayscale, the recognizable features are lost and not readily recognizable by image analysis algorithms because the shades of color are converted to the same shade or similar shades of gray.

More recently, some efforts have been placed on recognition of objects having little color variation.

An example of such efforts can be found in WO 2013/056315 to Vidal Calleja, which describes extracting features from training images, and clustering the features into groups of features termed visual words. Vidal Calleja also generally describes converting an image from an RGB color space a HSV color space.

Additional examples include U.S. Patent Application Publication No. 2011/0064301 to Sun describes a concatenation of a scale-invariant feature transform (SIFT) descriptor and HSV color; U.S. Patent Application Publication No. 2011/0316963 to Li describes fast and real-time stitching of video images to provide users with 3D panoramic seamless conferences of better luminance and hue effects by rectifying the color of the video images; U.S. Patent Application Publication No. 2012/0274777 to Saptharishi describes a system to track objects based on features that can include hue; and U.S. Patent Application Publication No. 2012/0147163 to Kaminsky describes changing a color map to enhance differences for color challenged users.

Another example can be found in "A Bag-Of-Features Approach Based On Hue-SIFT Descriptor For Nude Detection" by Lopes et al., which discusses the need to filter improper images from visual content by using a "Hue-SIFT," a modified SIFT descriptor with added color histogram information. Unfortunately, this requires modification of the standard SIFT descriptors themselves, which increases processing time due to additional calculation. A more useful solution, as described by the applicant's work below, would leverage unmodified off the shelf algorithms and their unmodified descriptors while increasing object resolution power.

None of the above references appear to quickly and efficiently recognize monochrome objects. Thus, there is still a need for improved metric-based recognition systems and methods.

SUMMARY OF THE INVENTION

In one aspect of the inventive subject matter, an apparatus comprises a memory communicatively coupled to a processor that can be configured to operate as an object recognition platform.

The memory can store one or more object-specific metric maps, which map an image color space of target object image data to a set of metric values selected to enhance detection of descriptors with respect to a specific object and with respect to a target algorithm. For example, an object-specific metric map can map an RGB value from each pixel of a digital representation of a target object to single metric channel of recognition values that can be processed by an image processing algorithm executing on the processor.

The processor, when operating as a recognition engine, can execute various object recognition steps, including for example, obtaining one or more target object-specific metric maps from the memory, obtaining a digital representation of a scene and including image data (e.g., via a sensor of a device storing the memory and processor, etc.), generating altered image data using an object-specific metric map, deriving a descriptor set using an image analysis algorithm, and retrieving digital content associated with a target object as a function of the metric-based descriptor set. Each of these steps is described in detail hereinafter.

Another aspect of the inventive subject matter includes a method of generating a metric-based recognition map via an image processing engine of the inventive subject matter. The image processing engine can comprise any commercially suitable computing device, preferably a computing device that is capable of receiving image data representative of an object, compiling one or more object-specific metric maps from at least a portion of the image data, and generating a metric-based descriptor set using a feature identifying algorithm.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
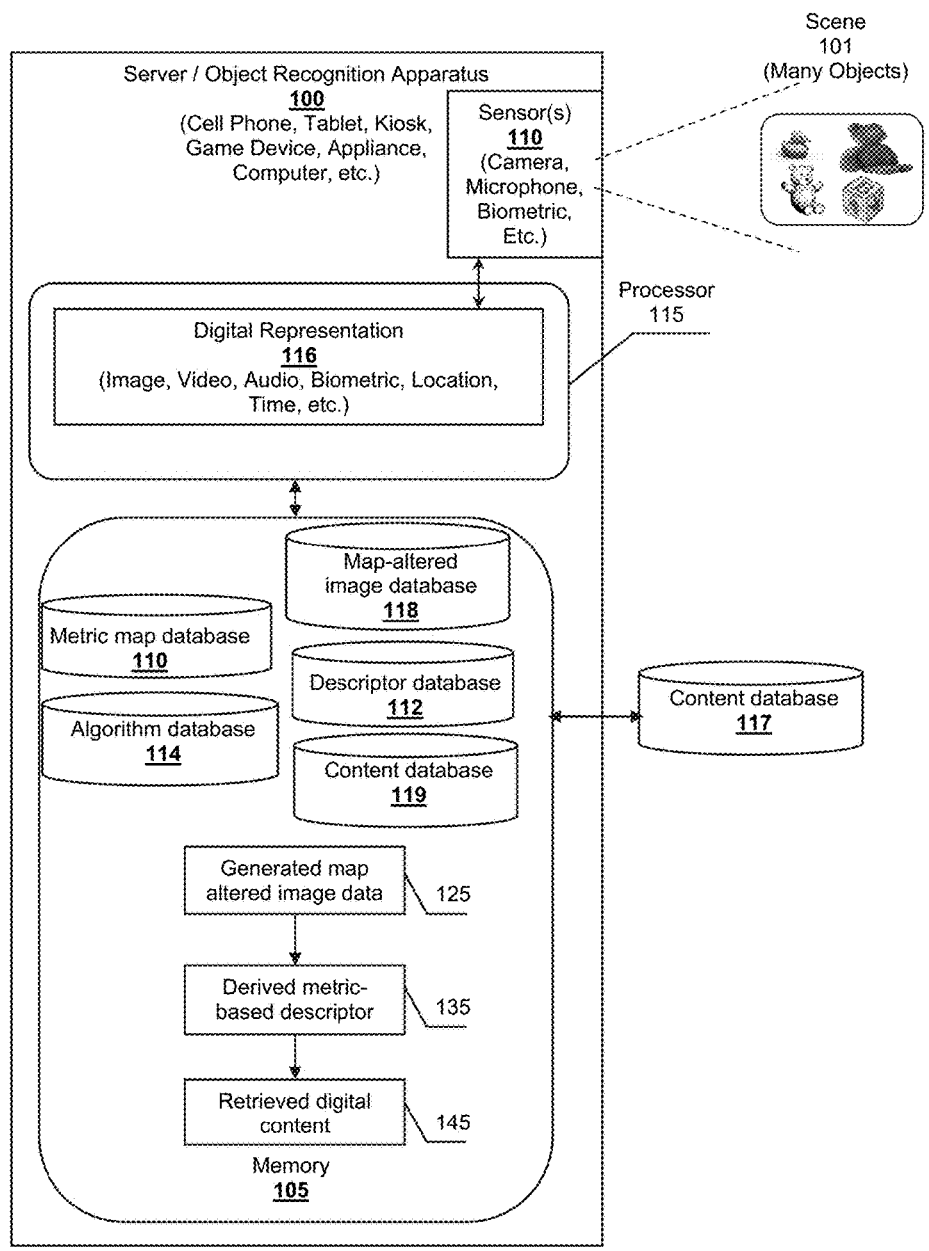
FIG. 1 is a schematic of an apparatus configured to recognize object within a scene based on metric values.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM®, ColdFire®, GPU, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, the Internet, LAN, WAN, VPN, or other type of packet switched network.

One should appreciate that the inventive subject matter provides systems, methods and apparatuses that allow quick and efficient recognition of low color variation objects using unmodified image analysis algorithms and associated descriptors. It should also be appreciated that systems, methods and apparatuses of the inventive subject matter can be used to recognize objects having some or even large variations in color (e.g., polychrome objects).

An apparatus of the inventive subject matter can advantageously capture a digital representation (e.g., image data, video data, audio data, etc.) of a scene including a monochrome object, and utilize target-object specific metrics maps and existing image analysis algorithm(s) to match the monochrome object with a known target object and provide digital content associated with the target object.

Previously available systems are generally directed towards recognition of polychrome objects via converting image data of the object to grayscale images, and thus are apparently not capable of efficient and reliable object recognition of objects that lack sufficient grayscale variation when the object's image data has been converted to grayscale. This is because images of monochrome objects, when converted to grayscale, lack recognition fidelity with respect to various image processing algorithms (e.g., SIFT, BRISK, DAISY, etc.). For example, in the market space of toys targeting young girls, the toys might comprise portions molded from pastel shades of plastic (e.g., pinks, greens, blues, etc.). When an image of such a toy is converted to grayscale for object recognition image processing, the various shades are converted to substantially the same shade of gray. The image processing algorithms lack sufficient sensitivity to the minor variations (if any) of gray scale gradients and thus fail to identify relevant features.

Consider a scenario where a toy comprises a Disney® toy representing a castle for an Ariel® princess doll and that has many different pastel colors. Existing technologies, including those described in co-owned U.S. Pat. No. 7,016,532 can fail to identify the castle due to the similarity of the pastel colors even though such technologies might be viable for other types of features (e.g., shape, make, model, etc.). The disclosed approach improves on such recognition capabilities by providing object-specific metric maps that indicate how image data could be altered to enhance features (e.g., descriptors, etc.) in the image with respect to the capabilities of one or more image processing algorithms. Further, the metric maps provide a single value channel that can be tailored specifically for a target object or group of target objects, as well as a target algorithm. For example, a dedicated software app running on a device (e.g., tablet, smart phone, game console, etc.) can include one or more object-specific metric maps that specifically target the Ariel® princess toy, as well as the Ariel® collection of toys, including the toy castle. Thus, the dedicated software app is able to interact efficiently with the toy collection, or specific toys in the collection. The software app would likely not be efficient with other objects at all because the object-specific metric maps lack tailoring to the other objects.

It is contemplated that a dedicated software app can include any number of object-specific metric maps that target any number of objects and object types. However, it could be advantageous to have a dedicated software app that includes only object-specific metric maps targeting a limited number of objects (e.g., Disney® toys for girls, Disney® toys for boys, Disney® princess toys, Disney® Toy Story® toys, etc.) to improve return speed of relevant digital content. This approach is considered advantageous for several reasons. First, the application-specific metric maps target specific objects allowing for a very efficient user experience. Second, application-specific metric maps become a valuable commodity, which can increase the market value of object, toys, or apps, through additional purchasing by the consumer.

FIG. 1 is a schematic of an exemplary embodiment of an object recognition apparatus 100 of the inventive subject matter. Object recognition apparatus 100 can advantageously be used to identify monochrome objects (e.g., duck toy, teddy bear, toy block, etc.) represented in a digital representation 116 of a scene 101. Scene 101 could comprises nearly any setting or environment where monochrome objects might exist. For example, scene 101 could comprise an indoor space; perhaps a child's room, a play area, a school room, a mall, an operating room, a store, a sports arena, or other space. Further, scene 101 could also comprise an outdoor space; perhaps including a park, a playground, a stadium, a roadway, or other outdoor area.

Object recognition apparatus 100 can comprise any commercially suitable computing device having a sensor 110 configured to acquire digital representation 116 of a real-world scene 101 or an object. Object recognition apparatus 100 could include or be communicatively coupled to a second device comprising a memory 105, and a processor 115 configured to operate as an image recognition engine.

In the example shown, object recognition apparatus 100 comprises memory 105, sensor 110, and processor 115 that is coupled to memory 105 and sensor 110, and configured to operate as a recognition engine. Processor 115 can be configured to function as a dedicated virtual reality interface for the toys in scene 101 by software instructions stored in memory 105. Returning to the example of a dedicated software app associated with the Ariel toy collection, the app would use the object-specific metric maps to recognize the toys and might present augmented reality content overlaid on images of the toys.

A user can capture a digital representation 116 of scene 101 via one or more sensors 110 of object recognition apparatus 100, and be presented with digital content (e.g., augmented reality content, chroma key content, offers, promotions, product information, animations, graphics, new functionality, etc.) related to a target object. Scene 101 can comprise any suitable number or type of real-world, physical objects. In the example presented, the objects are depicted as toys where each toy has little color variation, referred to euphemistically as being "monochrome" where represented in grayscale for the sake of discussion. For example, a toy block could include portions having various shades of pastel colors (e.g., pink, blue, green, etc.). In such cases, when an image of the toy block is converted to grayscale for image processing, each color shade is likely converted to very similar shades of gray, which results in reduced recognition fidelity with respect to one or more image processing algorithms (e.g., SIFT, FREAK, DAISY, BRISK, etc.), especially algorithms that seek to establish features based on gradients. In the example, the objects can be recognized more readily by executing an object-specific metric map obtained from metric map database 110 on the digital representation where the map is purposefully constructed, possibly in a data-driven empirical fashion, to increase recognition fidelity of the object with respect to one or more image processing algorithms. Thus, the object-specific metric map can be considered a tailored mapping of the image color space to a single channel of metric values that has been customized to the object and to the image processing algorithm. The term "object-specific metric map" should be construed to mean a computing module that can include software instructions stored in memory 105 and executable by processor 115 where the computing module operates one digital representation 116 to generate a new data representation for input to a target image processing algorithm so that the target image processing algorithm yields features having higher object resolving power.

The following use case illustrates one method in which a user can use a dedicated software app to obtain digital content associated with objects of scene 101. For purposes of this example, the toys in scene 101 can be located on the third floor of an FAO Schwartz® toy store in Times Square. A user walking into the Times Square store may have a smart phone running a software app dedicated to targeting at least one of the following: objects in FAO Schwartz® stores generally, objects in the Times Square FAO Schwartz®, or objects in a specific section or floor of the FAO Schwartz® store. In this example, the user's mobile device runs a software app dedicated to targeting objects on the third floor of the Times Square FAO Schwartz® store. Thus, the software app advantageously obtains contextually relevant object-specific metric maps that target the limited number of toys on the third floor for increased content return speed. The reduced set of object-specific metric maps can be determined through using the device's GPS sensor, accelerometer, magnetometer, or other sensor to establishing a location, position, or heading. Each object-specific metric map in metric map database 110 can be tagged with or indexed by such contextual attributes (e.g., location, heading, store ID, social network attributes, etc.).

When the software app is running on the user's device 100, the user can point device 100 at scene 101 (a portion of the third floor), and quickly receive digital content associated with one or more of the objects in scene 101. This digital content can include, among other things, an advertisement, a video clip associated with one of the objects, a user rating of the object, a popularity of the object, a comic strip associated with one of the objects, a virtual representation of other toys associated with the object including location or price data, a price associated with the object or other toys that may be of interest to the user.

Memory 105 can comprise various types of data stored in one or more databases 110, 112, 114, and 119 that can be used in the object recognition process. In the embodiment shown in FIG. 1, metric map database 110 comprises object-specific metric maps (e.g., maps targeting toys on the third floor of the Times Square FAO Schwartz®, etc.), which can be used to generate a metric altered version of the image data in the captured digital representation ("map-altered image database 118") via the processor 115.

The map-altered image data can comprise a conversion of RGB values (i.e., three color channels) or other image values to one or more metric values (i.e., a signal channel of values rather than three color channels) on a pixel-by-pixel basis to be stored in map-altered image database 118 as further described with FIG. 2 below. Descriptor database 112 comprises one or more metric-based descriptor sets, derived by executing an image analysis algorithm from algorithm database 114, on the map-altered image data of map-altered image database 118. As discussed above, image analysis algorithms can comprise, among other things, SIFT, FREAK, DAISY, BRISK, or other image algorithms capable of generating descriptors or other types of key points or features.

Content databases 119 (local to device 100) and 117 (separate from device 100) comprises digital content that are associated with the targeted objects of object-specific metric maps, which can be presented to a user that captures a digital representation of a scene including the target object or related object.

Figure 2:
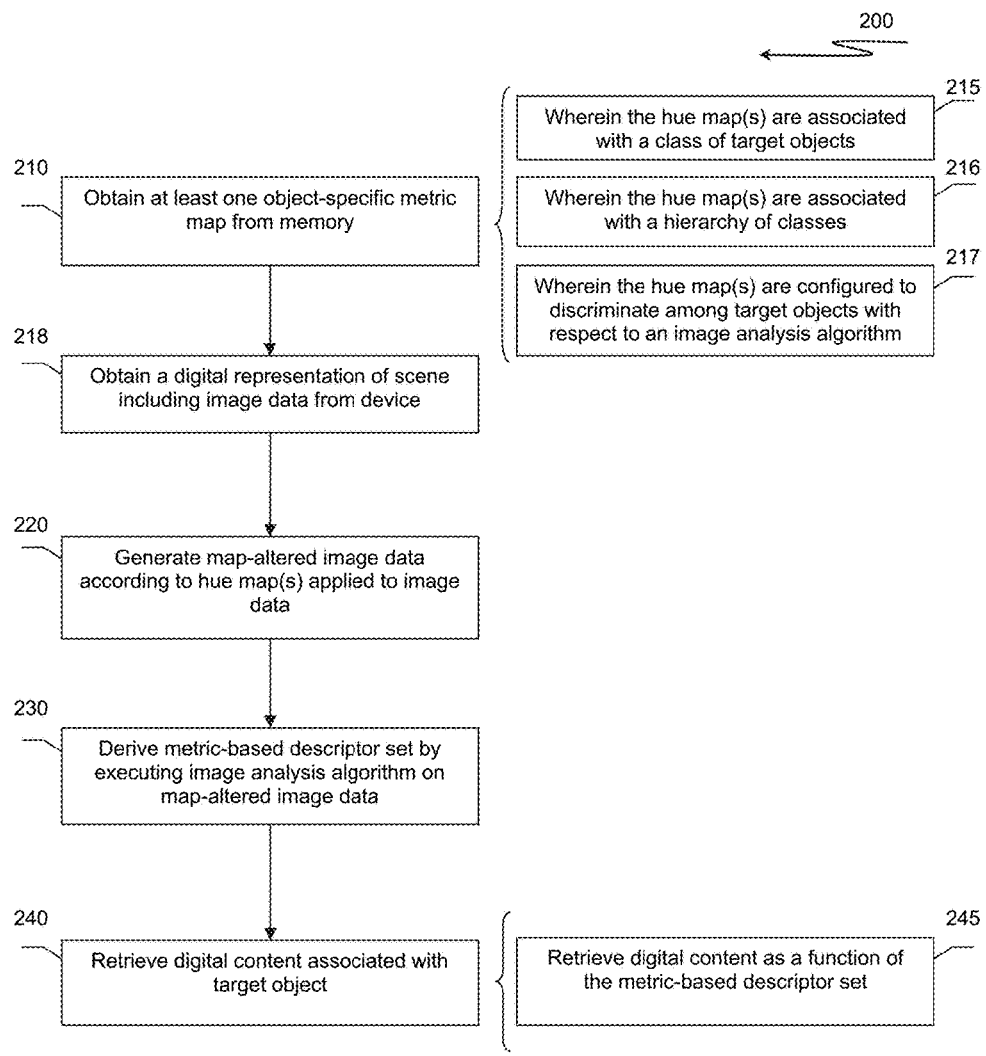
FIG. 2 presents a method of recognizing objects from a digital representation based on metric values.

FIG. 2 presents a method executable by processor 115 of FIG. 1, showing the flow of data through the system. As represented by steps 210 and 218, processor 115 obtains a digital representation of a scene including image data from a camera-enabled mobile device, and one or more object-specific metric maps from metric map database 110 of memory 105.

It is contemplated that an "object-specific metric map" can be pre-generated for storage in memory 105. A metric map can be representative of a single or multiple channels, one or more of which can comprise a color channel conveying color information as a scalar value. In some embodiments, object-specific metric maps comprise a single color channel conveying hue information, which can be derived from image data having a multi-color channel system (e.g., RGB, CMYK, etc.) based on an appropriate function. However, one should appreciate that the metric values in the object-specific metric map do not necessarily have to correspond to color values. Rather, the metric values could be considered "color-less" information derived as function of an image's color data. The metric values are generated to give rise to efficient generation of descriptors from a target image processing algorithm. Further, the metric values can include scalars, vectors, tensors, or other values derived from pixel-level color data.

The object-specific metric map can include a mapping function configured or programmed to convert multi-channel color data (e.g., RGB), possibly at the pixel level, to a single channel (e.g., hue, vectors, gradients, etc.). The mapping could include a direct color mapping where color in the multi-channel color space can be converted to a similar or standards defined hue. For example, orange (e.g., R=0xFF, G=0x45, B=0x00) can be converted to an orange hue value of 16.2 assuming a standard implementation RGB to HSV conversion algorithm and a hue value ranging from 0 degrees to 360 degrees (see "RGB to HSV color conversion" by RapidTables, retrieved on Aug. 14, 2014, for an example algorithm; found at URL www.rapidtables.com/convert/color/rgb-to-hsv.htm).

The color mapping could be non-linear (e.g., a mapping that compresses a range of colors from the image color space to the set of hues, a mapping that stretches a range of colors from the image color space to the set of hues, or a user defined mapping of the image color space to the set of hues, etc.). Still further the mapping does not necessarily have to be a color mapping at all, but could be based on any mapping function that dictates how image data should be processed for a specific object or group of objects. Thus, the color image data could be converted directly to metric values based on an a priori generated look-up table. All conversion algorithms are contemplated.

For example, a color mapping could convert all non-pink colors to a hue value of 0, while all pink colors could be represented as having hue values between 1 and 200. Thus, the hue mapping can be tailored to increase the recognition fidelity of a specific object because subtle variations in image color of an object can become more pronounced with respect to a target image processing algorithm. An alternative example could include a non-linear mapping where RBG values are converted to desired metric values via a look up table using the three channel RGB values indices in a 3D table.

An astute reader might consider that while metric map database 110 could store a select few number of object-specific metric maps directed to a small group of target objects as discussed above, it can also be configured to store hundreds, thousands, or even hundreds of thousands or more object-specific metric maps that target numerous objects of various classifications. In such embodiments, it is contemplated that metric map database 110 can be stored in a memory of a remote server, and communicatively coupled to memory 105 to thereby transmit sets of metric maps relevant to a user, perhaps in real-time based on user or device contextual attributes (e.g., user preferences, location, time, etc.).

To assist in narrowing a set of obtained object-specific metric maps for possible use in generating map-altered image data, it is contemplated that existing object recognition technologies can be utilized. As discussed above, the step of obtaining the one or more metric maps can include determining a contextual relevance of at least one of the obtained metric maps based on the utilization of existing object recognition technologies on the digital representation (e.g., using data associated with a location, an orientation, a time, a user preference, a news event, a motion a gesture, an acceleration, a biometric, an object attribute of an object, a shape, polychrome objects located near a monochrome object to be recognized, etc.) to determine a narrowed set of object-specific metric maps that may be of relevance.

The following use case provides an example embodiment where metric map database 110 might be stored in a memory of a remote server. Rather than running an FAO Schwartz® specific software app, a user may use a device running a software app configured to execute steps that allow recognition of various types of objects throughout the city of New York. When a user captures a digital representation of a scene via the device, contextual data such as location data, GPS coordinates, or other data associated with the device may also be captured and sent to the remote server storing metric map database 110. Based on the contextual data received, the remote server can identify a set of metric maps that best match to the contextual data and transmit only the set of metric maps to memory 105. For example, if the user captures a digital representation while in a Sephora® store on Lexington Avenue, location information can be sent to the remote server, and metric maps targeting objects in the Sephora® store (or objects within a certain radius of the Sephora® store) can be transmitted to memory 105. As another example, if the user captures a digital representation while at the Empire State Building on $5^{th}$ Avenue, the $5^{th}$ Avenue location information can be sent to the remote server, and metric maps targeting objects in the Empire State Building can be transmitted to memory 105.

The object-specific metric maps can be transmitted or conveyed to apparatus 100 through one or more techniques. In some embodiment, apparatus 100 stores existing maps in memory 105, which with an identifier. The server could simply send a packet of data with an appropriate identifier. Alternately, the object-specific metric map would be sent to apparatus 100 in the form of a function description or executable code configured to operate on the image data. Still further, the maps could remain resident on the server and apparatus 100 could send the image data to the server via a web-services API for the specific map.

While the metric maps are referred to as "object-specific," it should be noted that this term is used euphemistically, and can include metrics maps associated with a single target object, a brand, a trade dress, type or other classification of target objects as shown in step 215. An object-specific metric map can also be associated with a hierarchy of target object classes as shown in step 216. For example, a set of object-specific metric maps associated with a group of "princess toy" target objects can be prioritized according to a manufacturer, brand, quality, price, rank, look, materials, or any other suitable factor or factors. Thus, the set of object-specific metric maps can comprise a first priority set of metric maps (e.g., maps associated with Disney® princess toys), and second priority metric maps (e.g., maps associated with Barbie® princess toys). In such an embodiment, it is contemplated that an object-specific metric map targeting Disney® princess toys can be executed on the image data first. This priority can be based on the first-mover, a payment schedule, affiliate status, popularity of a class, user reviews of a class, or any other commercially suitable basis.

As shown in step 217, it is also contemplated that an object-specific metric map can be configured to discriminate among target objects with respect to an image analysis algorithm. In other words, an object-specific metric map can be tailored to a specific image analysis algorithm such as SIFT, FREAK, or BRISK, such that an application of the algorithm can result in an optimal descriptor set for object recognition purposes. Thus, the object-specific metric map can be a priori constructed to optimize results of a desired image processing algorithm as discussed further below with respect to FIGS. 3A and 3B.

In step 220, map-altered image data is generated by executing one or more object-specific metric maps on image data of the digital representation obtained in step 218. Expanding on the examples provided above, image data as originally captured or obtained by processor 115 can sometimes comprise three color channels per pixel: an "R" value between 0-255, a "G" value between 0-255, or a B value between 0-255.

The RGB value of each pixel can be mapped to a metric value, wherein the metric value can comprise the only channel. In this manner, the ability to recognize an object in an image will be independent of the lighting environment in which the image is captured because the conversion process eliminates lighting issues and reduces the information down to raw color data.

In an embodiment where the metric value corresponds loosely to a hue value, "H", where each pixel's H value derived as a function of the RGB values. The function executed on the three channel RGB values can be defined in any way and can result in the object-specific metric map. One should appreciate that the hue example presented below is for illustrative purposes only. The inventive subject matter is not limited to color or hue-based object-specific hue maps.

For example, an object-specific metric map for an object comprising pink and yellow colors ("Pink/Yellow Hue Map") can include a function dictating the following:
  Where RGB represents any color other than pink or yellow, the RGB values are mapped to a scalar value of 0;
  Where RGB represents a pink color (e.g., pastel pink, neon pink, fluorescent pink, dark pink, light pink, vivid pink, etc.), a stretched spectrum hue value of 1-100 is to be assigned to maximize the differences apparent depending on the lightness, chroma or other characteristic of the pink;
    For example, pastel pink is represented in RGB as 255, 209, 220, while bright maroon is represented by 195, 33, 72. Pastel pink's hue value is typically represented by 346, while bright maroon is also represented by 346.
    However, because the function dictates a conversion of pink RGB values to hue values of between 1-100, pastel pink can be assigned a metric hue value of 1, while bright maroon can be assigned a metric hue value of 88.
    In this manner, pixel groups comprising variations in pink can be readily identified when an image analysis algorithm is executed on the image data.
  Where RGB represents a yellow color, a stretched spectrum hue value of 150-200 is to be assigned.
    For example, cornsilk is represented in RGB as 255, 248, 220, while vanilla is represented by 243, 229, 171. Cornsilk and vanilla's hue values, however, each equal 48.
    Because the function dictates a conversion of yellow RGBs to a stretched hue value of between 150 and 200, cornsilk can be assigned a metric hue value of 155, while vanilla can be assigned a metric hue value of 185.
    In this manner, minor variations in yellow can be readily identified when an implementation of an image analysis algorithm is executed on the image data.
  Furthermore, it is contemplated that differences between pastel pink and vanilla (or any other colors) can also be more readily identified.

One should appreciate that the above discussion represents a constructed example for illustrative purposes only. Further, one should appreciate that object-specific metric maps do not necessarily result in values similar to the original image. Rather, the resulting metric values could be quite different from color values so that the image processing algorithm can differentiate pixel-level features more readily based on the derived metric value. Such an approach can be achieved because image processing algorithms, SIFT for example, lack any a priori understanding of color and only operate based on pixel-level numeric values. Thus, the pixel-level color data from the image data can be mapped to any other metric values to increase the effective of the target algorithm.

Processor 115 can execute one or more of the object-specific metric maps on image data included in the digital representation 120, and generate map-altered image data 125 by mapping RGB values of image data pixels to metric values in accordance with a function within the object-specific metric map (e.g., look up table, algorithm, script, etc.). Because minor variations in color can be exaggerated as discussed above, execution of image analysis algorithms can more readily identify objects represented in the digital representation 116.

It is contemplated that map-altered image data 125 can comprise, among other things, a new image file, a portion of a video, an overwritten image, pixel-level data (using raw image data) of a portion or entire digital representation, or a modified image of the image data. For example, where image data is captured including a pink or yellow object, executing the Pink/Yellow Hue Map discussed above can generate a new image showing all non-pink or yellow pixels as white, while all pixels including pink or yellow coloring can be represented according to the Pink/Yellow Hue Map. Where image data is captured not including an at least partially pink or yellow object, all pixels in the map-altered image data can appear as NULL value pixels.

Once the map-altered image data 125 has been generated, processor 115 can execute any suitable image analysis algorithm associated with the object-specific map on the map-altered image data 125 and derive a metric-based descriptor set 135 as shown in steps 230. This can be true even where executing the same image analysis algorithm on the originally captured image data (from which the map-altered image data is generated) would result only in deriving a smaller, less discriminating descriptor set, or no descriptor set.

Using SIFT as an example, the derived metric-based descriptor set 135 can then be compared with SIFT descriptors in a local content database 119 or remote content database 117 where digital content 145 has been indexed according to various SIFT descriptors generated from image data of known objects. Thus content databases 119 and 117 provide a link between metric-generated descriptors and digital content. It is contemplated that content database 119 or 117 can be built in any commercially suitable manner. For example, a system manager can construct such databases capturing an image of a target object. The image data can converted to metric values, and have all specularity removed from the image data if desired. The system manager can utilize an ingestion engine to execute SIFT algorithm on the metric-based image to generate an initial metric-generated descriptor set. Further, the ingesting engine can generate recommendations on possible object-specific metric maps to increase the or otherwise change resulting descriptor sets. Once a desirable object-specific metric map yields desirable descriptors, the resulting descriptors can be used to index content information associated with the target object. User devices can then utilize the object-specific metric map to recognize the target object. When map-altered image data is derived from a user captured digital representation and includes the same descriptor or descriptors, the digital content can be retrieved and displayed on the user's device.

For example, where a target object comprises a yellow and red teapot from Teavana™, an image can be captured of the object, an object-specific metric map targeting the teapot can be created as described above (with a focus on yellow instead of pink), and executed on the image to generate a map-altered image. The object-specific metric map can map all non-yellow RGB values to a NULL value. In the map-altered image, all portions other than the yellow can appear uniformly as white, including the red portions. A SIFT algorithm can be run on the map-altered image, and various descriptors can be derived. One descriptor set might be associated with the pixels including a yellow loose-leaf tea holding portion of the teapot (wherein the pixels can include pastel yellow, light yellow, cream, lemon chiffon, electric yellow and canary yellow, etc.). This descriptor set can be linked to an online store selling high quality loose-leaf teas. Another descriptor set might be associated with the various yellow pixels including a rim configured to hold a specific type of cup. This descriptor set can be linked to an online catalogue of William-Sonoma™ who could sell suitable cups.

It is contemplated that digital content 145 linked to descriptors can comprise any commercially suitable digital content, including for example, interactive content, virtual objects, augmented reality objects, mixed reality objects, web pages, information addresses, audio content, text content, graphics, animations, image content, video content, Internet data, a link to a webpage, text, audio, any combination thereof, or any other suitable digital content. As shown in steps 240 and 245, processor 115 can retrieve some or all of the digital content and present the digital content to a user, for example, by rendering the digital content over an image of a real-world object (e.g., superimposed over the image of the real-world object).

Figure 3A:
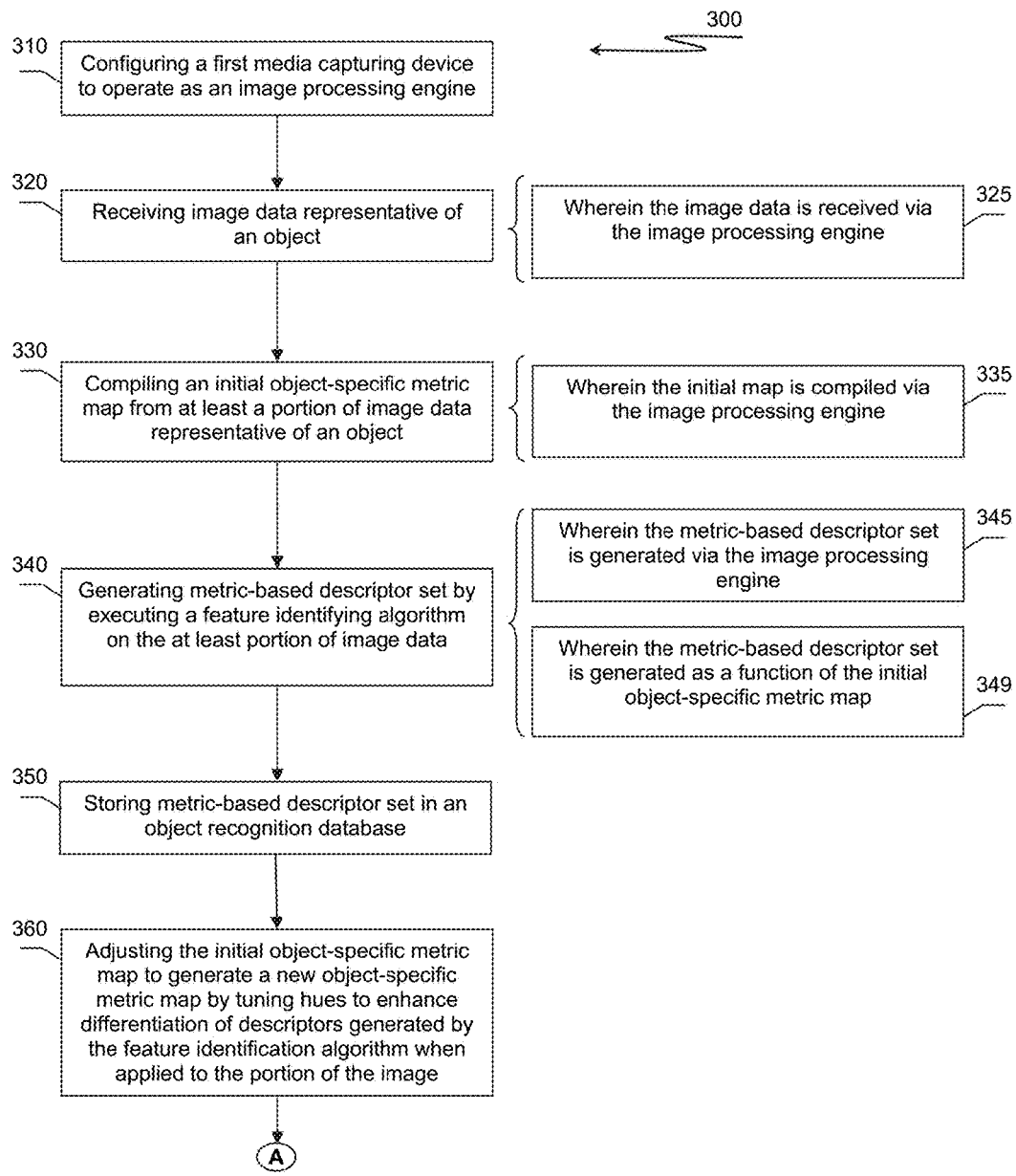
FIG. 3A presents a method for generating an object-specific metric map that enables devices to recognize specific objects.
Figure 3B:
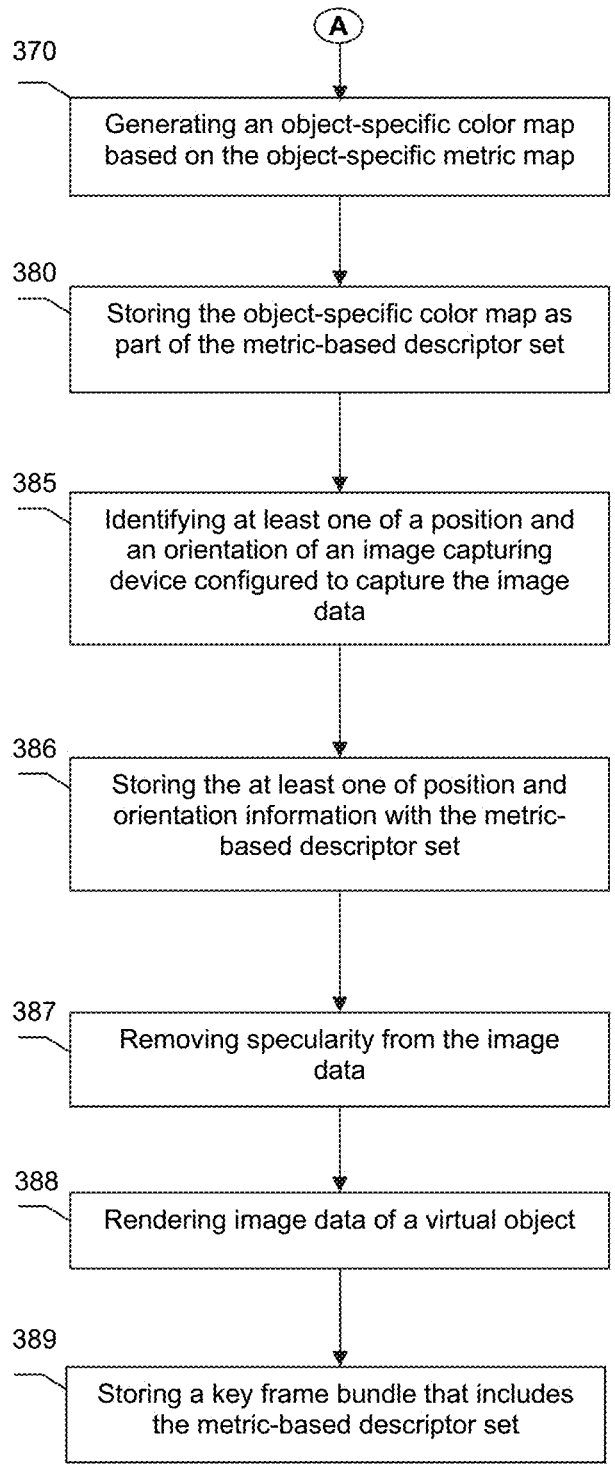
FIG. 3B presents a continuation of the method in FIG. 3A.

FIGS. 3A and 3B show a possible method 300 of generating metric-based recognition maps in accordance with the inventive subject matter. A first step is configuring a computing device to operate as an image processing engine as shown in step 310, on which each of the following steps can be executed. The following discussion can be considered part of an object ingestion process through which known or target objects are digitally analyzed. The results of the analysis include data (e.g., descriptors, maps, etc.) that enable recognition engines to identify or recognize similar objects in the field.

All commercially suitable computing devices are contemplated for use with the inventive subject matter, including for example, a mobile phone, a tablet computer, a laptop computer, an electronic book reader, a camera, a video camera, a smart phone, a kiosk, or any other device having a sensor and a user interface.

As shown in step 320, image data representative of an object in a scene is received. The image data can be received from the computing device operating as an image processing engine as shown in step 325, or can be received from a different device communicatively coupled to the computing device and comprising a camera, video camera, or other data capturing means.

It should be appreciated that the term "image data" is used broadly to include, among other things, a still image, a video frame, a video frame delta, a video, a computer rendered image, a computer generated image or graphic, a projection, printed matter, an on-screen image, medical images, or other types of images.

As shown in step 330, an initial object-specific metric map can be compiled from the image data, including at least a portion of the image data representing an object of interest (i.e., target object). The initial object-specific metric map represents a mapping of color values to metric values (e.g., scalars, vectors, etc.).

In some embodiments, the initial object-specific metric map is generated in an empirical, data-driven fashion, possibly with respect to one or more invariant proprieties. Consider generating object-specific metric maps for a toy castle comprising several problematic pastel colors, where it is desired that the toy castle should be recognized regardless of lighting conditions; the object-specific metric map should be lighting invariant. An imaging processing engine can be presented with image data of the castle with various lighting conditions. As the lighting conditions are varied, the imaging processing engine can execute a desired image processing algorithm on the image data to derive descriptors. The engine can further compile which RBG values remain invariant as the lighting is changed and yield the best results for high quality descriptors. The engine can further construct (e.g., automatically, manually, semi-automatically, etc.) the object-specific metric map (step 330) that indicates how the RGB should be mapped to metric values how to generate best results under all lighting conditions. This approach could result in a look-up table, a well-defined function, or combination. Thus, the resulting initial object-specific metric map can be tailored to a specific object, class of object, or image processing algorithms through a data drive, empirical approach.

Historically, scene recognition has been quite problematic due to the wide variety of lighting conditions that could exist, especially in outdoor spaces or indoor spaces with varied lighting. In such cases, the object-specific, or even scene-specific mapping should also be invariant with respect to the environmental lighting conditions. The object-specific or scene-specific mapping could be derived or computed from a collection of images captured over various times (e.g., day, night, weather conditions, etc.). For example, images of a park or other outdoor setting could be collected from social media photos. Especially preferred collections of images would represent the scene over one or more complete lighting cycles (e.g., day-night, seasons, sunny-cloudy, etc.). As discussed previously with respect to toys, the processing engine can derive features and observe which RGB values remain invariant over time or environmental lighting conditions, and which yield most useful, high quality descriptors.

In some embodiments, the function represented by the object specific metric can be discovered by the image processing engine. For example, through analysis of multiple, similar objects, the image processing engine can compare or contrast each individual object's specific map. Each map can be treated has having a functional complexity with respect to the computation steps necessary to convert RGB values to individual metrics. Complexity might be measured by size of look up table, number of calculations, or other factors. The maps lacking complexity, yet yielding resolving power can be selected as being the most relevant for the class of objects. A form of principle component analysis could operate on the various dimensions (e.g., constants, scales, operations, etc.) of the of map's functions across the class of objects to reduce the features of the collective map's complexity.

Similarly to step 320 (and any other step of the inventive subject matter, e.g., 340, 345, 349, 350, 360, 370 . . . , etc.), this step can be carried out via the image processing engine, or another engine, server or platform, distal or local.

As shown in step 340, a metric-based descriptor set can then be generated by executing a feature identifying algorithm on the image data or portion thereof as a function of the initial object-specific metric map. For example, an implementation of SIFT could be executed on the image data after converting the image data color information to a single metric value channel according to the initial object-specific metric map.

The initial object-specific metric map compiled in step 330 can be adjusted to generate a new object-specific metric map in accordance with step 360, thereby allowing customization thereof. For example, the initial map can be adjusted by tuning the function in a manner effective to enhance a differentiation of descriptors generated by the implementation of the feature identification algorithm (e.g., SIFT, FAST, etc.) as executed on the portion of the image data or map-altered image data. This can be accomplished, for example, via acceptance of user input that alters at least some of the metric values within the initial object-specific metric map, via an image processing engine recommendation of modifying one or more of the metric values to increase a confidence of a descriptor, via an image processing engine's automatic adjustment of one or more of the metric values of an initial object-specific metric map, or any other commercially suitable process.

Similarly to the initial object-specific metric map, the new object-specific metric map can comprise any suitable mapping of a color channel (or multiple color channels) in a pixel to a different metric-based channel or channels.

As shown in step 370, an object-specific color map can be generated based on the (initial or a new) object-specific metric map. In other words, it is contemplated that an object-specific metric map for an object having more than one color can be broken down into color regions to advantageously. The object-specific metric map generated in step 370 can be stored as part of the metric-based descriptor set or a key frame bundle in accordance with step 380.

It is also contemplated that a time of day, a position, or an orientation of the image capturing device, or any other commercially suitable contextual data, can be identified in accordance with step 385. Such contextual data can be used in connection with systems, apparatuses and methods of the inventive subject matter to assist determining a contextual relevance of at least one of the obtained metric maps as described above in connection with FIG. 1. As shown in step 386, some or all of the contextually relevant information can be stored in a database with the metric-based descriptor set for use by the object recognition apparatus in determining a contextual relevance of object-specific metric maps.

As shown in step 387, it is also contemplated that in some embodiments one or more characteristics can be removed from image data at the pixel-level to allow for increased and more consistent differentiation of the values in the image data. For example, image data may comprise various characteristics that hinder a differentiation of colors on a pixel-level basis (e.g., illumination color, illumination geometry, surface reflectance, surface geometry and view-point, diffuse reflection, specular reflection, etc.). Removal of, or zeroing out, one or more of the characteristics can improve the effectiveness of image analysis or feature identification algorithms on an image as many algorithms assume perfect diffuse reflections and consider locations of specular reflection to be outliers. Such assumption reduces the robustness of these algorithms since the presence of specular reflection is inevitable in most real-world environments.

In another aspect of the inventive subject matter, it is contemplated that key frame bundles can be generated or stored as described in step 389 (e.g., in one or more of databases 110, 112, 114, or 116), which can provide assistance in identifying objects represented in images at different angles, positions or distances.

As used herein, a "key frame" refers to a collection of recognition information, possibly object specific, including for example, images, image data, recognition features or descriptors, content links, normal vectors, camera attributes, estimated focal length, lighting condition information, database indices, or other information derivable from an object model. Key frames can be generated for numerous poses, positions, orientations, scales, relative locations, or other parameter of an object. For purposes of this application, a "key frame bundle" can be thought of as an object-specific database of various key frames derived via an object model that further assists in object recognition regardless of what portion of the object is captured in the digital representation.

A benefit of using key frame bundles is that it allows for an understanding a priori of the exact position, orientation, or other configurations of each modeled feature, and can bind the recognition features directly to the modeled points. Thus, the system can be considered to "know" all possible views of an object. Additional information related to key frames and key frame bundles can be found in co-owned U.S. patent application Ser. No. 14/332,371 titled "Fast Recognition Algorithm Processing, Systems and Methods", filed Jul. 19, 2015.

A number of interesting uses cases would benefit from the disclosed techniques beyond the toy market as mentioned. In view that the disclosed techniques provide for expanding on subtle differences in color that a human might not distinguish, subtle difference in tissue could be identified. Consider a scenario where one or more object-specific metric maps are instantiated for a person. A map that focuses on skin tone could be used to generate features that aid in identifying a specific person's face, which could then be digital tracked in video data using their skin-specific map. Further, the same or different skin map could be used to identifier variations of the person's skin, which could be indicative of a melanoma or other lesion. Still further, the person could have one or more tissue-specific maps that aid in differentiating structure or features of internal organs during surgery. An overhead camera can monitor a surgery while a recognition engine identifies the various tissues or corresponding features. A projector can use the information related to the feature to indicate where interest features are located (e.g., tumors, etc.). Feature such as tumor could be identified because such features might fail to conform to the person's tissue-specific maps.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of generating a metric-based recognition map comprising:
   receiving, by a computing device configured to operate as an image processing engine, image data of at least part of a person;
   compiling, by the image processing engine, an initial object-specific metric map for the person from the image data of the at least part of the person;
   generating, by the image processing engine, a metric-based descriptor set by executing an image analysis algorithm on the image data as a function of the initial object-specific metric map; and
   storing the metric-based descriptor set in an object recognition memory.

2. The method of claim 1, further comprising adjusting the initial object-specific metric map to generate a new object-specific metric map by tuning metric values in a manner effective to enhance differentiation of descriptors generated by the image analysis algorithm as executed on the portion of the image data.

3. The method of claim 2, wherein adjusting the initial object-specific metric map includes accepting user input that alters at least some metric values within the initial object-specific metric map.

4. The method of claim 2, wherein adjusting the initial object-specific metric map includes the image processing engine recommending at least one a metric value that increases a confidence of a descriptor.

5. The method of claim 2, wherein adjusting the initial object-specific metric map includes the image processing engine automatically adjusting metric values of the initial object-specific metric map.

6. The method of claim 2, wherein the new metric-based map comprises a non-linear mapping from metric values within the initial metric-based map.

7. The method of claim 1, further comprising generating an object-specific color map based the object-specific metric map.

8. The method of claim 7, further comprising storing the object-specific color map as part of the metric-based descriptor set.

9. The method of claim 1, further comprising identifying at least one of a position and an orientation of an imaging device configured to capture the image data.

10. The method of claim 9, further comprising storing the at least one of the position and the orientation with the metric-based descriptor set.

11. The method of claim 1, further comprising removing specularity from the image data.

12. The method of claim 1, wherein the object-specific metric map comprises a pixel-level metric map.

13. The method of claim 1, wherein the metric-based descriptor set comprises lighting invariant descriptors.

14. The method of claim 1, wherein the metric-based descriptor set comprises metric-based invariant descriptors.

15. The method of claim 14, wherein the metric-based descriptors comprise metric-based scale invariant descriptors.

16. The method of claim 1, wherein the object comprises a physical object.

17. The method of claim 1, further comprising storing a key frame bundle that includes the metric-based descriptor set.

18. A non-transitory computer readable medium storing instructions executable on a processor for processing image data of at least part of a person to generate a metric-based recognition map, the instructions comprising instructions to:
compile an initial object-specific metric map for the person from the image data of the at least part of the person;
generate a metric-based descriptor set by executing an image analysis algorithm on the image data as a function of the initial object-specific metric map; and
store the metric-based descriptor set in an object recognition memory.

19. A device for generating a metric-based recognition map comprising:
a computing device configured to operate as an image processing engine, the image processing engine configured to:
receive image data of at least part of a person;
compile an initial object-specific metric map for the person from the image data of the at least part of the person;
generate a metric-based descriptor set by executing an image analysis algorithm on the image data as a function of the initial object-specific metric map; and
store the metric-based descriptor set in an object recognition memory.

20. The method of claim 1, wherein the map for the person comprises at least one tissue-specific map.

21. The method of claim 20 further comprising:
the at least one tissue-specific map aiding a recognition engine in differentiating structures or features of internal organs during surgery, and
the recognition engine identifying one or more features such as tumors because such features fail to conform to the person's tissue-specific map.

22. The computer readable medium of claim 18, wherein the map for the person comprises at least one tissue-specific map.

23. The computer readable medium of claim 22, further comprising:
instructions for aiding a recognition engine in differentiating structures or features of internal organs during surgery, and
the recognition engine identifying one or more features such as tumors because such features fail to conform to the person's tissue-specific map.

24. The device of claim 19, wherein the map for the person comprises at least one tissue-specific map.

25. The device of claim 24, further configured to:
aid a recognition engine in differentiating structures or features of internal organs during surgery, and
the recognition engine identifying one or more features such as tumors because such features fail to conform to the person's tissue-specific map.

26. The method of claim 1, wherein the map for the person is based on skin tone.

27. The method of claim 1, wherein the map for the person is based on skin features.

28. The method of claim 1, wherein the map for the person is based on tissue type.

29. The method of claim 1, wherein the map for the person is based on tissue features.

30. The method of claim 1, wherein the map for the person identifies a location of a tumor.

31. The method of claim 30, wherein the tumor is identified as a feature that fails to conform to a tissue-specific map for the person.

* * * * *